Inventor:
WILLIAM ROLKE
By Carl V. Olson
Attorney

Inventor:
WILLIAM ROLKE
BY Carl V. Olson
Attorney

INVENTOR.
WILLIAM ROLKE
BY Carl V. Olson
Attorney

March 18, 1969 W. ROLKE 3,433,932

PUNCHED CARD READER

Filed Nov. 30, 1964 Sheet 4 of 7

INVENTOR.
WILLIAM ROLKE

BY Carl V. Olson

Attorney

INVENTOR.
WILLIAM ROLKE
BY
Carl V. Olson
Attorney

INVENTOR.
WILLIAM ROLKE
BY
Carl V. Olson
Attorney

Inventor:
WILLIAM ROLKE
By Carl V. Olson
Attorney

United States Patent Office 3,433,932

Patented Mar. 18, 1969

3,433,932

PUNCHED CARD READER

William Rolke, Merchantville, N.J., assignor to Radio Corporation of America, a corporation of Delaware Filed Nov. 30, 1964, Ser. No. 414,776

U.S. Cl. 235—61.11 9 Claims

Int. Cl. G06k 7/06

ABSTRACT OF THE DISCLOSURE

A punched card reader into which cards are manually fed one at a time. A card fed down into a hopper enters a U-shaped frame located between stationary and movable contact plates. The leading edge of the card closes a microswitch which energizes a solenoid. The solenoid acts through a mechanical linkage (1) to cause the frame to be pulled down, pulling the card to a sensing position, and (2) to cause the moveable contact plate to be driven horizontally against the card and the stationary contact plate for electrical sensing of the holes in the card. After the card is sensed, the solenoid is deenergized, causing the card to be pushed up for manual removal.

This invention relates to punched card readers useful, for example, in connection with electronic data processing equipment, and particularly to punched card readers of the type into which punched cards are manually fed one at a time, and of the type in which the card is arrested at a card sensing position where all holes in the card are electrically sensed.

The correct electrical reading of the locations of all of the punched holes in a punched card requires that the punched card be very accurately positioned in relation to the sensing means. The transporting of a card to the sensing position at which all holes can be sensed is complicated by the fact that substantially the entire surface of a card normally is reserved for the storage of information in the form of punched holes. This leaves only very small peripheral margins of the card for gripping the card when moving the card to, and holding the card at, the sensing position. The operator's fingers cannot be used for moving the card to, and holding the card at, the sensing position because there is not enough clearance for the fingers when the sensing electrodes are driven against the card. Therefore, a mechanical card moving and holding means is required in a card reader to which cards are manually fed one at a time. Previously known card readers have been less than completely satisfactory in reliability of operation, particularly when used to read cards which have been somewhat deformed due to careless handling.

It is therefore a general object of this invention to provide an improved punched card reader which is particularly reliable and accurate in operation.

It is a more specific object of the invention to provide an improved manually-fed punched card reader in which the transporting of a card to a sensing position involves the manual feeding of the card to an intermediate position at which manual control of the card can no longer be maintained and at which automatic control of the card takes over.

It is another object to provide an improved manually-fed punched card reader in which there is no danger to the operator's fingers.

It is a further object to provide an improved manually-fed punched card reader capable of correctly reading punched cards that are appreciably deformed due to careless handling.

It is yet another object to provide an improved manually-fed card reader in which the positioning, sensing and ejecting of a card is accomplished by the motive power from a single solenoid operating through mechanical linkages.

A manually-fed punched card reader in accordance with an example of the invention includes a stationary plate having a card-engaging surface provided with parallel, electrically-conductive column sensing strips. The stationary plate is provided with a stop for arresting a moving card at a sensing position. A moveable plate is normally spaced from the stationary plate and has a card-engaging surface provided with parallel, resilient, electrically-conductive row sensing strips. A U-shaped card-receiving-and-transporting frame has sides slideably mounted on sides of the stationary plate with an offset therefrom to receive the side edges of a card between the stationary plate and the frame. Card-gripping spring fingers are provided on the sides of the frame, and a card-operated switch trip means is mounted with limited freedom on the bottom end of the frame.

A hopper is provided for guiding a manually-fed card into the frame to an almost completely enveloped position at which the card engages and displaces the switch trip means, which in turn closes an electrical switch. A solenoid electrically connected to operate in response to the closing of the switch acts through mechanical linkages to draw the frame downwardly with a given overtravel past the card sensing position at which the card is arrested by the stop, and to drive the moveable plate toward the stationary plate for electrically sensing holes in the card therebetween. The switch trip means is constructed to maintain the switch closed when the frame is displaced downwardly. Finally, there is an electrical switch to deenergize the solenoid and cause the retraction of the moveable plate, and the upward return of the frame. The upward return of the frame ejects the card to a position protruding from the hopper by substantially the amount of the given overtravel.

Figure 1:
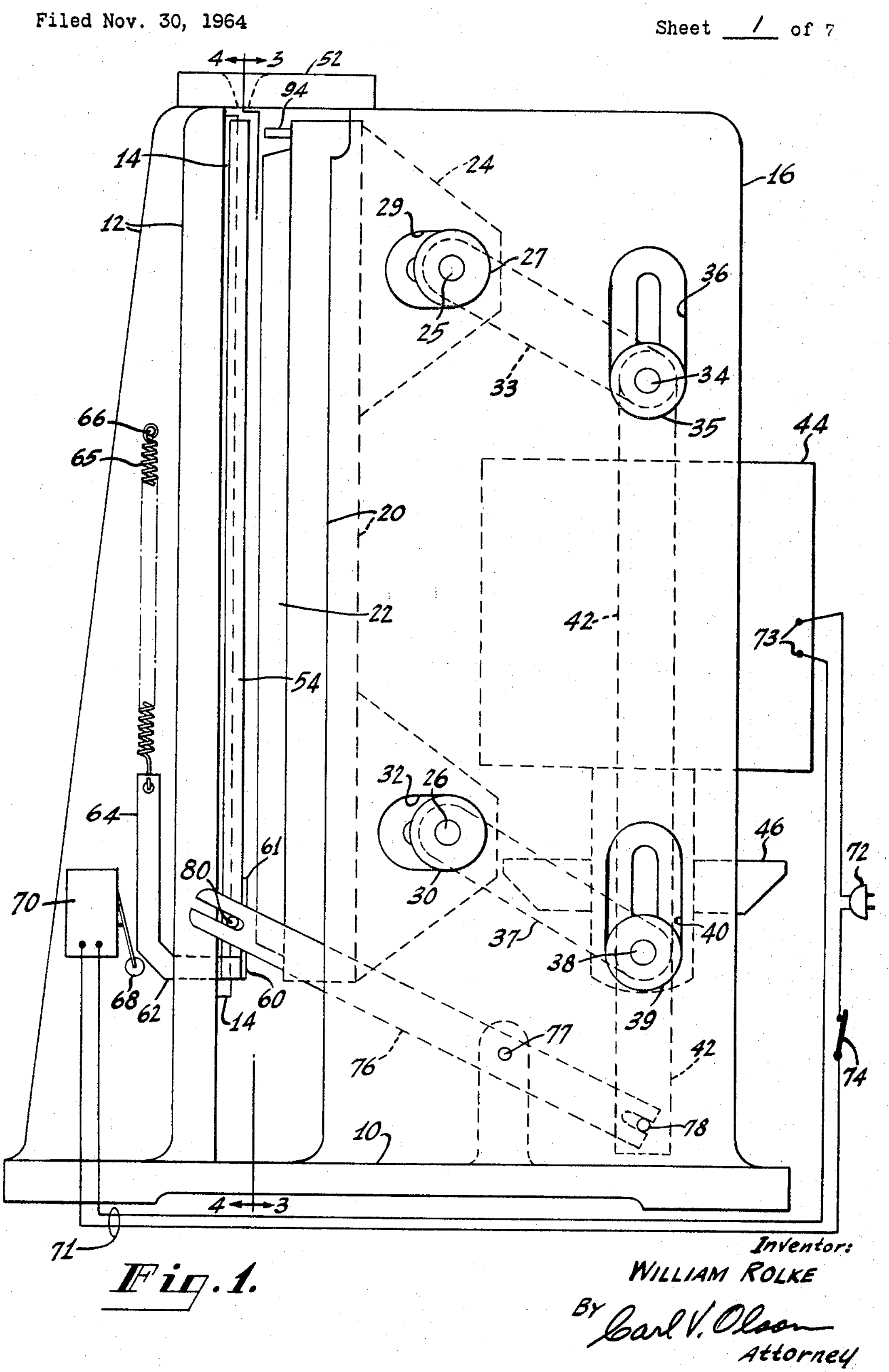
FIG. 1 is a side elevation of a manually-fed punched card reader constructed according to the teachings of the invention and shown with the parts in positions occupied when the reader is ready to receive a manually-supplied punched card.
Figure 2:
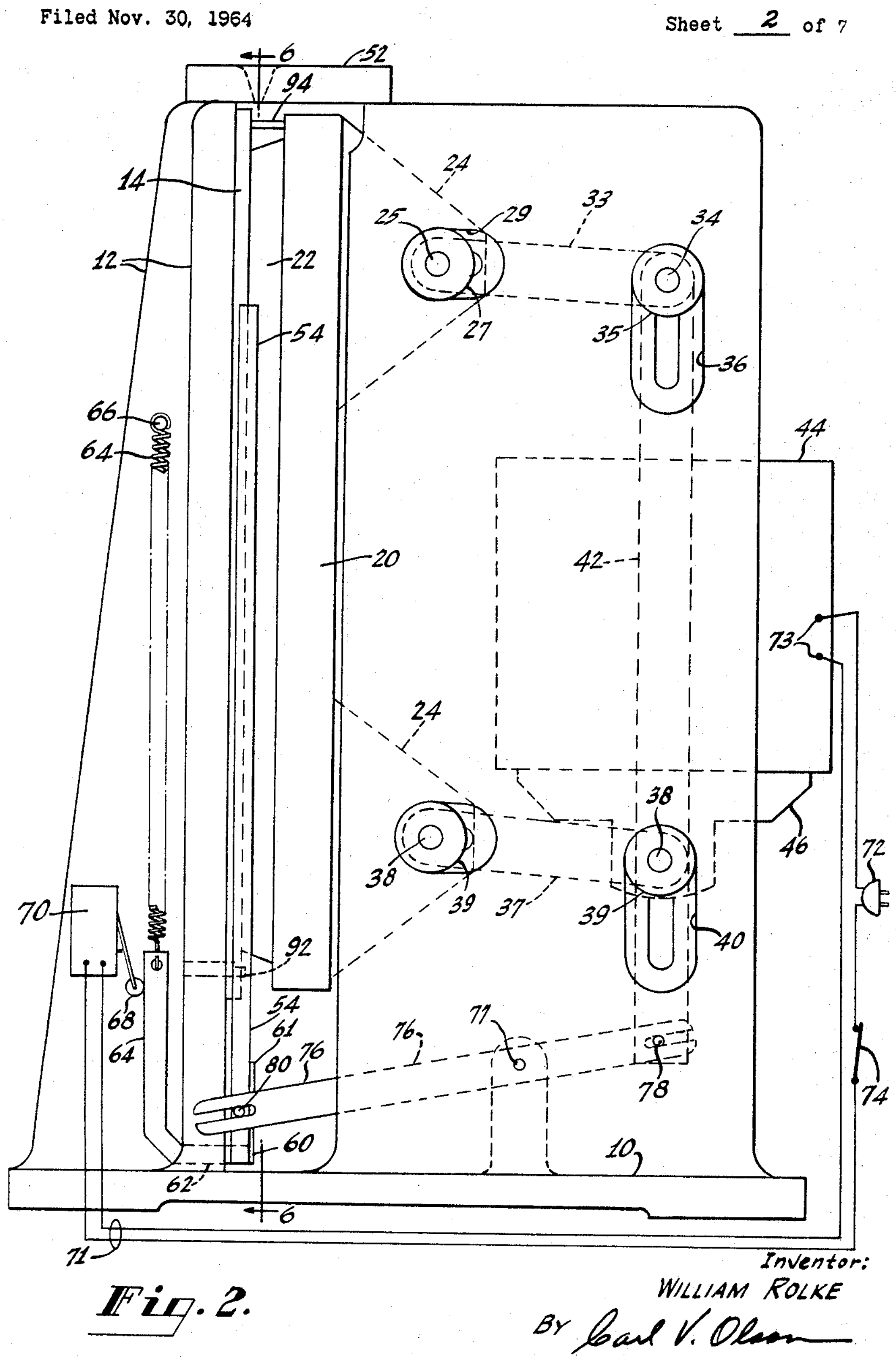
FIG. 2 is a side elevation of the card reader of FIG. 1 showing the parts in positions occupied when a punched card is being electrically read.
Figure 3:
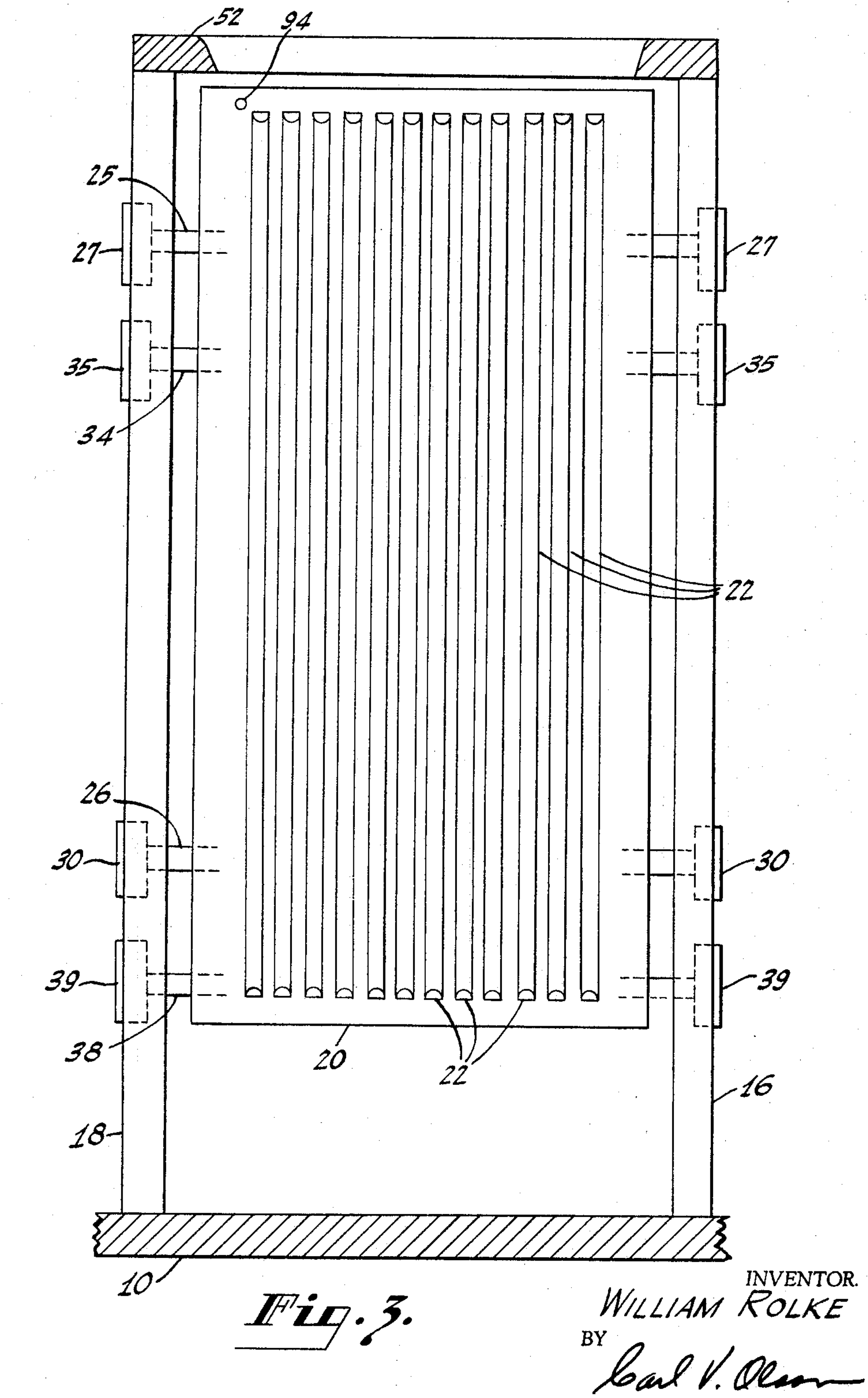
FIG. 3 is a sectional view looking in the direction of the arrows 3—3 in FIG. 1 and showing a moveable plate having vertical electrically-conductive sensing strips.

Reference is now made in greater detail to the punched card reader shown in FIGS. 1 through 9. The reader includes a base 10, a vertical support 12 for a stationary plate 14, and vertical supports 16 and 18 for a moveable plate 20. The moveable plate 20 has a card-engaging surface, as shown in FIG. 3, provided with parallel, resilient, electrically-conductive row sensing strips 22 extending in vertical directions.

The moveable plate 20 is provided with four rearwardly-extending projections 24, of which the two projections on one side are indicated by dashed lines in FIG. 1. The projections 24 provide journals for shafts 25 and 26. As shown in FIGS. 1 and 3, shaft 25 has wheels 27 located in horizontal tracks 29 in vertical support members 16 and 18. Shaft 26 likewise has wheels 30 located in horizontal tracks 32 in vertical support members 16 and 18.

The shaft 25 is connected by means of links 33 to a shaft 34 having wheels 35 constrained to travel in vertical tracks 36 in vertical support members 16 and 18. Similarly, shaft 26 is connected by means of links 37 to a shaft 38 having wheels 39 constrained to travel in vertical tracks 40 in vertical support members 16 and 18. The shafts 34 and 38 are connected by means of two vertical drive links 42. Only one of each of the links 33, 37 and 42 is indicated in FIGS. 1 and 2 because the other is immediately behind the one shown. The parts described constitute a right-angle motion drive. Vertical motion imparted to vertical drive links 42 causes a horizontal motion of moveable plate 20 having a lesser travel and a greater force.

A solenoid 44 is mounted between the two vertical support members 16 and 18 and between the two vertical drive links 42. The solenoid 44 has an armature 46 connected to the shaft 38 for driving the vertical drive links 42. The solenoid armature 46 and the parts driven by the armature are shown in FIG. 1 in the positions they occupy when the card reader is idle and ready to receive a card. The armature 46 and parts driven by it are shown in FIG. 2 in the positions they occupy when a card is being read by the card reader.

Figures 4, 7, 8:
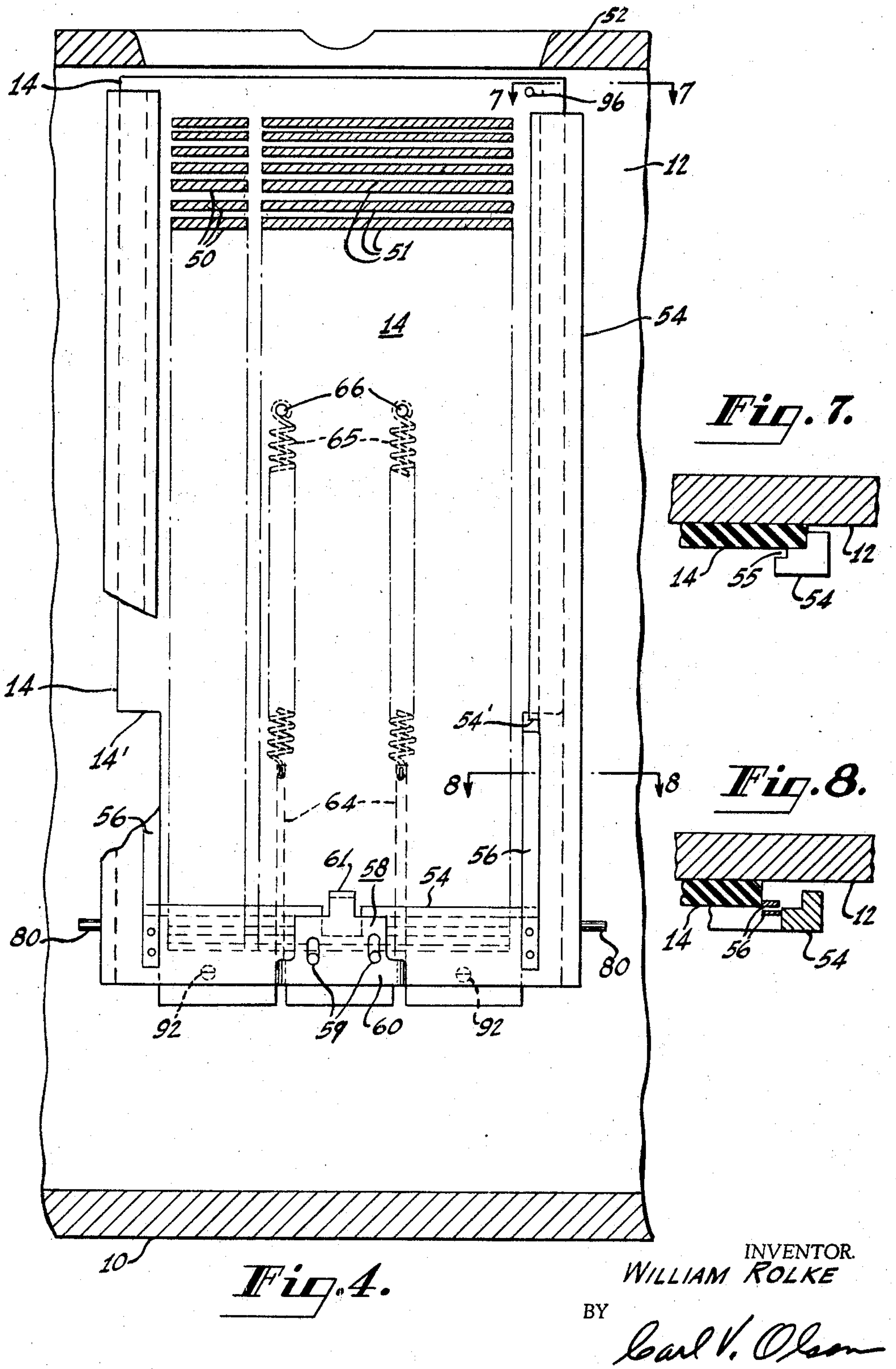
FIG. 4 is a sectional view looking in the direction of the arrows 4—4 in FIG. 1 and showing a stationary plate having horizontal sensing strips and showing other parts in positions they occupy when the reader is ready to receive a manually-supplied card.
FIG. 7 is a fragmentary sectional view taken along the line 7—7 in FIG. 4.
FIG. 8 is a fragmentary sectional view taken along the line 8—8 in FIG. 4.

Reference is now made to FIGS. 1 and 4 for a description of means for transporting a manually-fed card to an accurately-registered reading position. The stationary plate 14 is made of an electrically-insulating material and it has a card-engaging surface provided with parallel, electrically-conductive column sensing strips 50 and 51 extending in horizontal directions. The conductive strips 50 and 51 are made flush with the surface of the stationary plate 14 so that they cannot interfere with the motion of a punched card passing into position to be read. A hopper or guide 52 is provided for directing a manually-fed punched card into the card reader.

A U-shaped frame 54 is provided for receiving and mechanically transporting a manually-fed punched card. The U-shaped frame 54 has side members slideably or reciprocably mounted on the sides of the stationary plate 14, as shown in the fragmentary sectional view of FIG. 7. Suitable means such as rivets and slots (not shown) maintain frame 54 in sliding engagement with plate 14. The sides of the frame 54 slideably mounted on the sides of the stationary plate 14 are offset from the stationary plate 14 at 55 to provide channels or guiding grooves for receiving the side edges of a card inserted into the card reader.

The lower portions of the sides of the U-shaped frame 54 are provided with card-gripping spring fingers 56. The spring fingers 56 are connected at their bottom ends to the frame 54 and have card gripping upper ends located in notched out portions 54' of the frame 54, and in notched out portions 14' of the stationary plate 14. Each of the two spring fingers 56 shown in FIG. 4 consist, in fact, of two spring leafs, as shown in FIG. 8, for gripping both sides of a card. Fingers 56 are constructed to engage both sides of a card at the peripheral edges of the card in the very limited margins not allocated for punched-hole information.

The bottom end of the U-shaped frame 54 is provided with a switch trip means 58 which is mounted by rivet and slot means 59 for limited freedom in the vertical direction. The switch trip means 58 includes a main portion 60 supporting a grooved member 61 positioned to be acted upon by the lower edge of a card; portions 62 extending through openings in frame 54, stationary plate 14 and vertical support member 12; and upwardly extending cam portions 64. The ends of the cam portions 64 are connected by springs 65 to points 66 on vertical support member 12. The springs 65 urge the switch trip means 58 to the upward limit of its freedom on the frame 54. The springs 66 also urge the frame 54 upwardly against the force of gravity to an upper limit position.

One of the cam portions 64 of the switch trip means 58 is arranged to engage the actuator arm 68 of a microswitch 70 mounted on the vertical support member 12. The microswitch 70 has a normal, non-actuated open-circuited condition shown in FIG. 1. The microswitch 70 is electrically connected by means of wires 71 to control the flow of current from power supply plug 72 to the energizing terminals 73 of the solenoid 44. A normally-closed switch 74 is also provided in the circuit for interrupting the flow of current to the solenoid. Switch 74 may be actuated by a computer or other means utilizing information read from a punched card by the card reader.

Figures 6, 9:
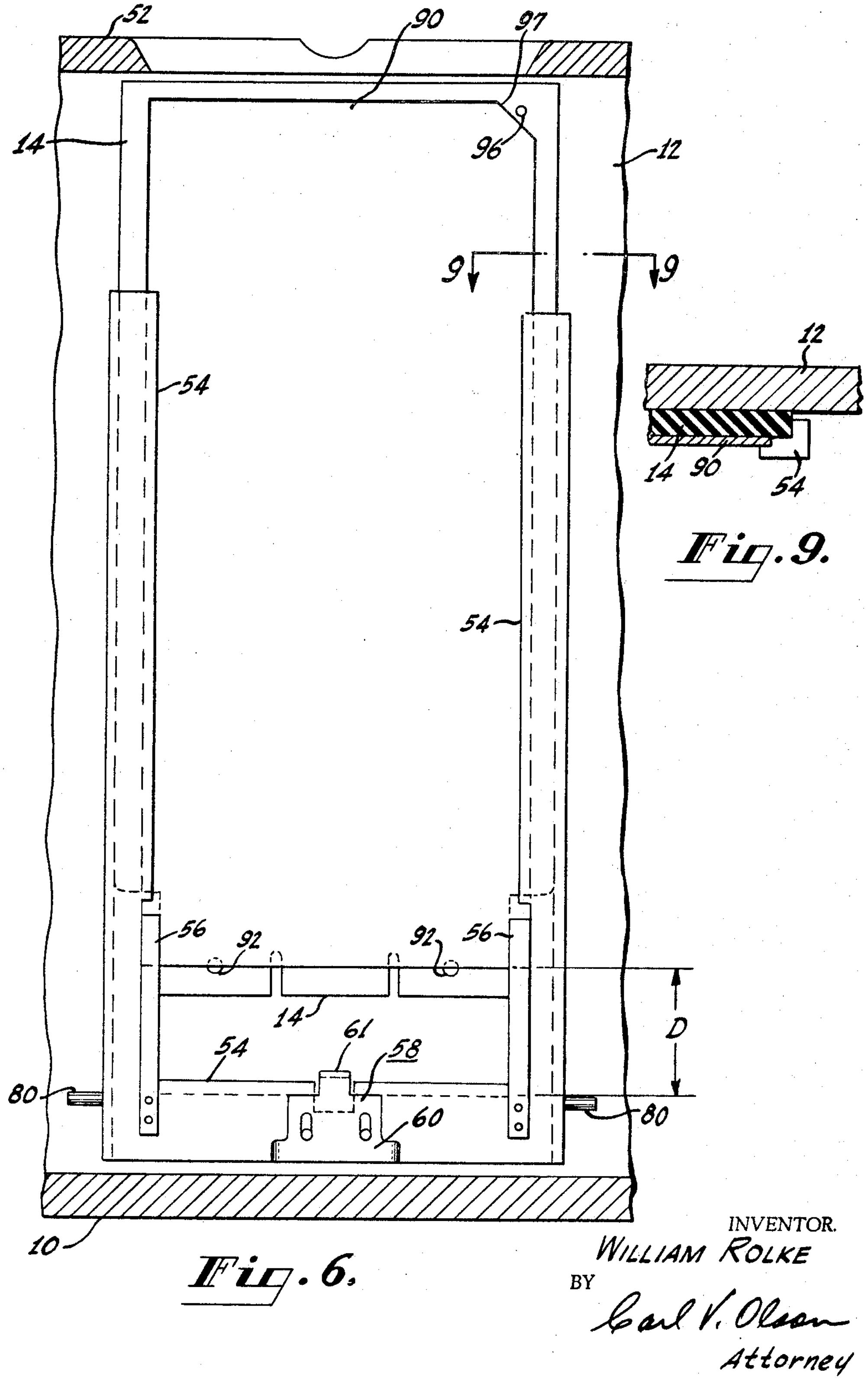
FIG. 6 is a view like those of FIGS. 4 and 5 but showing the punched card in position to be sensed.
FIG. 9 is a fragmentary sectional view taken along the line 9—9 in FIG. 6.

The U-shaped frame 54 is controlled in its sliding position along the stationary plate 14 by means of pivoted links 76 which are pivoted at 77. The pivoted links 76 are slotted at one end to engage pins 78 extending from vertical drive links 42, and are slotted at the other end to engage pins 80 extending from the sides of the U-shaped frame 54. FIGS. 1 and 4 show the pivoted links 76 and the U-shaped frame 54 in positions occupied when the card reader is ready to receive a card, and are shown in FIGS. 2 and 6 in positions occupied when the card reader is in the process of reading a card.

The lower part of the stationary plate 14 is provided with two protruding stops 92 shaped and positioned to arrest the downward movement of a punched card at a card-sensing position accurately registered in relation to the sensing strips on the stationary plate 14 and the sensing strips on the moveable plate 20.

An automatic interlock circuit may be used to permit the electrical reading of a punched card in the card reader solely when the punched card is correctly oriented, as indicated by the position of the cut-off corner 97, and is accurately registered in the sensing position, as indicated by being drawn to the stops 92. Detection of the cut-off corner may be accomplished by a contact pin 94 projecting from the moveable plate 20 for electric-circuit-completing engagement with a contact 96 on the stationary plate 14. Alternatively, the pin 94 may be a feeler which senses the presence or absence of card material thickness between it and the stationary plate 14 and accordingly actuates a switch (not shown) on the moveable plate 20. The positioning of the card against the stops 92 may be sensed by the mechanical actuator of a switch (not shown) positioned at the stops 92.

The operation of the card reader will now be described starting with an initial idle condition in which the parts are in the positions shown in FIGS. 1, 3 and 4. The moveable plate 20 is withdrawn, as shown in FIG. 1, from the stationary plate 14 leaving space therebetween for the insertion of a punched card.

A punched card is manually fed through the opening in hopper 52. The hopper directs the card to the path defined (at 55 in FIG. 7) by the sides of the U-shaped frame 54 and the stationary plate 14. The card 90 is pushed downwardly to the position shown in FIG. 5 by an operator who presses down on the top edge of the card with a finger or fingers. When in the position shown, the card 90 is almost completely enveloped by the card reader, so that the operator's fingers can be no longer pinch or grip the card to restrain or retard its movement. The card 90 as shown in FIG. 5 has been pushed to a position where the sides of the card near the bottom are gripped by the spring fingers 56 on the frame 54.

Figure 5:
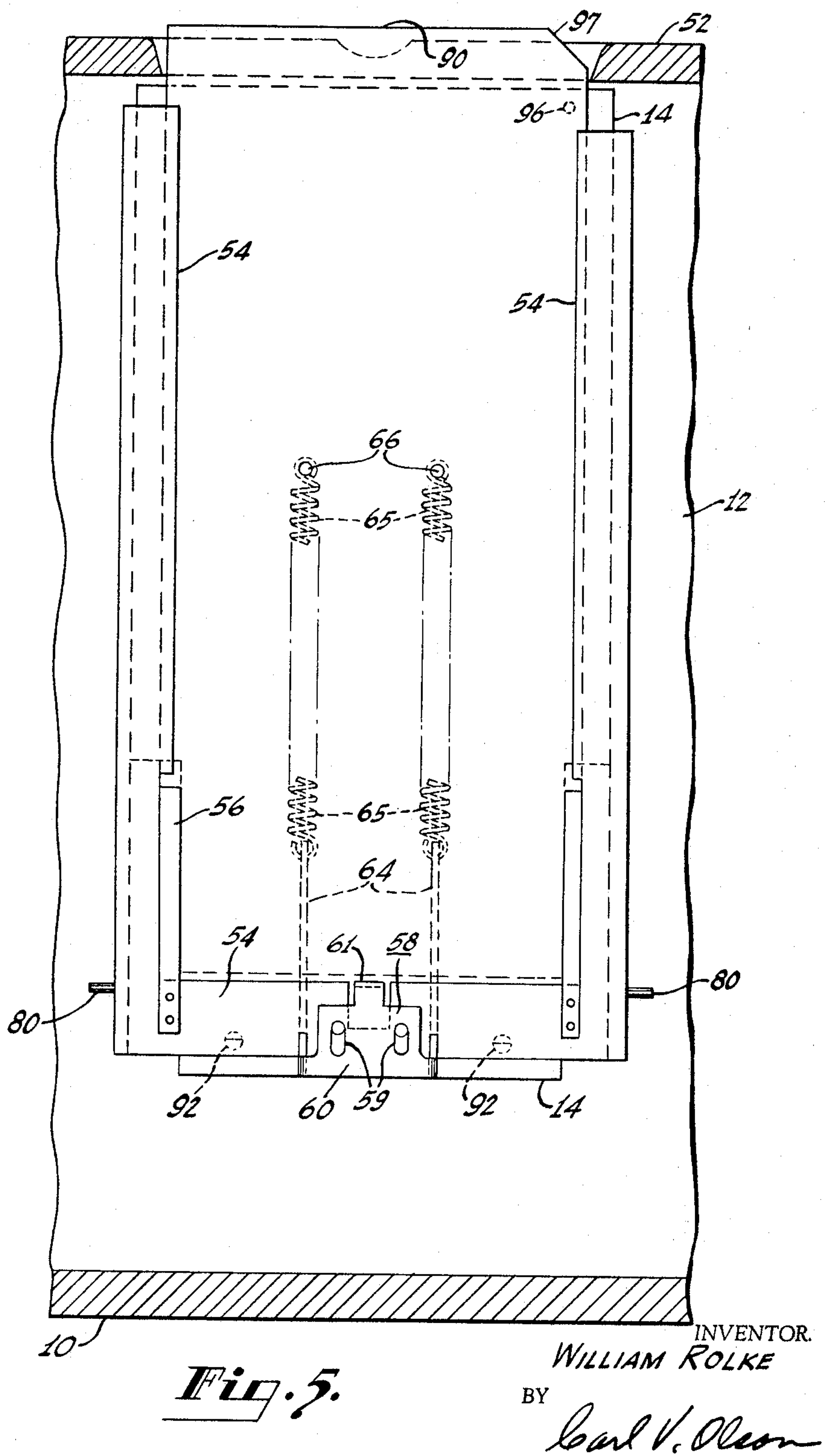
FIG. 5 is a view like that of FIG. 4 but showing a punched card at the position to which it is manually inserted.

The position of the card in FIG. 5 is also one in which the lower edge of the card 90 has engaged the switch trip means 58, and has pushed it downwardly against the force of springs 65. The downward movement of the switch trip means 58, relative to the frame 54 on which it is mounted with limited freedom, has caused the actuation of the microswitch 70. When the microswitch 70 is thus actuated, control of the card 90, which had previously escaped from possible restraint by the operator, is automatically seized by mechanical means in the card reader. The arrangement operates in such a way that control of the card is transferred from the operator to the card reader in a positive and unambiguous manner. The operator cannot inadvertently restrain the card and thus prevent it from reaching the correctly registered sensing position.

The closing of the microswitch 70 causes an energization of the solenoid 44 with the result that the solenoid armature 46 is suddenly driven upward to the position shown in FIG. 2. The armature 46 is connected to and raises the vertical drive link 42 which acts through right angle motion drive links 33 and 37 to drive the movable plate 20 toward the card 90 and the stationary plate 14. Before the row sensing strips 22 on the moveable plate 20 can reach the punched card 90, the upward movement of the vertical drive link 42 is transmitted through the pivoted links 76 to the pins 80 on the sides of the U-shaped frame 54. The frame 54 is pulled downwardly, and the spring fingers 56 on the frame 54 pull the card 90 downwardly with the frame.

The downward movement of the card 90 is arrested when the bottom edge of the card engages the stops 92 extending from the stationary plate 14. The U-shaped frame 54 continues its downward movement until the limit position is reached, which is as shown in FIGS. 2 and 6. FIG. 6 shows the card arrested by stops 92 at a card sensing position, and it shows the U-shaped frame 54 at rest after its overtravel a distance D past the position at which the card 90 is arrested. The spring fingers 56 engage or grip the card 90 just firmly enough to draw the card downwardly to the stops and to then let the card be arrested by the stops as the frame 54 continues its overtravel.

As has been mentioned, the energization of the solenoid 44 causes the simultaneous initiation of the horizontal movement of the moveable plate 20 and the downward movement of the frame 54 and card 90. The mechanical linkages are designed so that the frame 54 draws the card 90 to the stops 92 before the sensing strips 22 on the moveable frame 20 reach a position of engagement with the card 90. The sensing strips 22 on moveable plate 20 reach full engagement with the arrested card 90 at the same time that the U-shaped frame 54 reaches its lowest position as shown in FIGS. 2 and 6. Once the microswitch 70 is closed by the downward movement of the switch trip means 58, the microswitch 70 remains closed because the actuator arm 68 thereof remains engaged by the cam portion 64 of the switch trip means 58, as shown in FIG. 2.

When the parts are in the positions shown in FIGS. 2 and 6, the punched card 90 is accurately positioned in its information sensing position. The card is compressed between the stationary plate 14 having horizontally-extending conducting strips 50 and 51 and the resilient, electrically-conductive, vertically-extending sensing strips 22 on the moveable plate 20. The resilient vertical conductive sensing strips make electrical contact, through holes in the card, with the horizontal conductive sensing strips on the stationary plate 14. Wires (not shown) connect the horizontal and vertical sensing strips to electronic means for interpreting and utilizing the information represented by the locations of punched holes on the card being sensed.

When the utilization apparatus has received and accepted the information read from the punched card, the utilization apparatus may cause the opening of switch 74 and the consequent deenergization of the solenoid 44. When the solenoid 44 is thus deenergized, the armature 46 falls due to the force of gravity from the position shown in FIG. 2 back to the initial position shown in FIG. 1. If desired, spring means or other suitable means can be used to insure the rapid return of the solenoid to its initial position. The resulting movement of the vertical drive link 42 causes the moveable plate 20 to be withdrawn from contact with the punched card, and causes the frame 54 to be moved upwardly. The spring fingers 56 on the frame 54 engage the card 90 and urge it upwardly as the frame 54 is driven upwardly.

Starting from the relative positions of frame 54 and card 90 shown in FIG. 6, the frame 54 moves upwardly carrying the card 90 along until the card 90 is extended from the hopper 52 by an amount substantially equal to the previous overtravel distance D. The card is thus expelled from the hopper 52 a sufficient distance so that it can be conveniently grasped by the fingers of an operator for complete withdrawal from the card reader. The switch 74 is then reclosed and the card reader is again ready to receive and read the next punched card manually fed to it.

Figure 10:
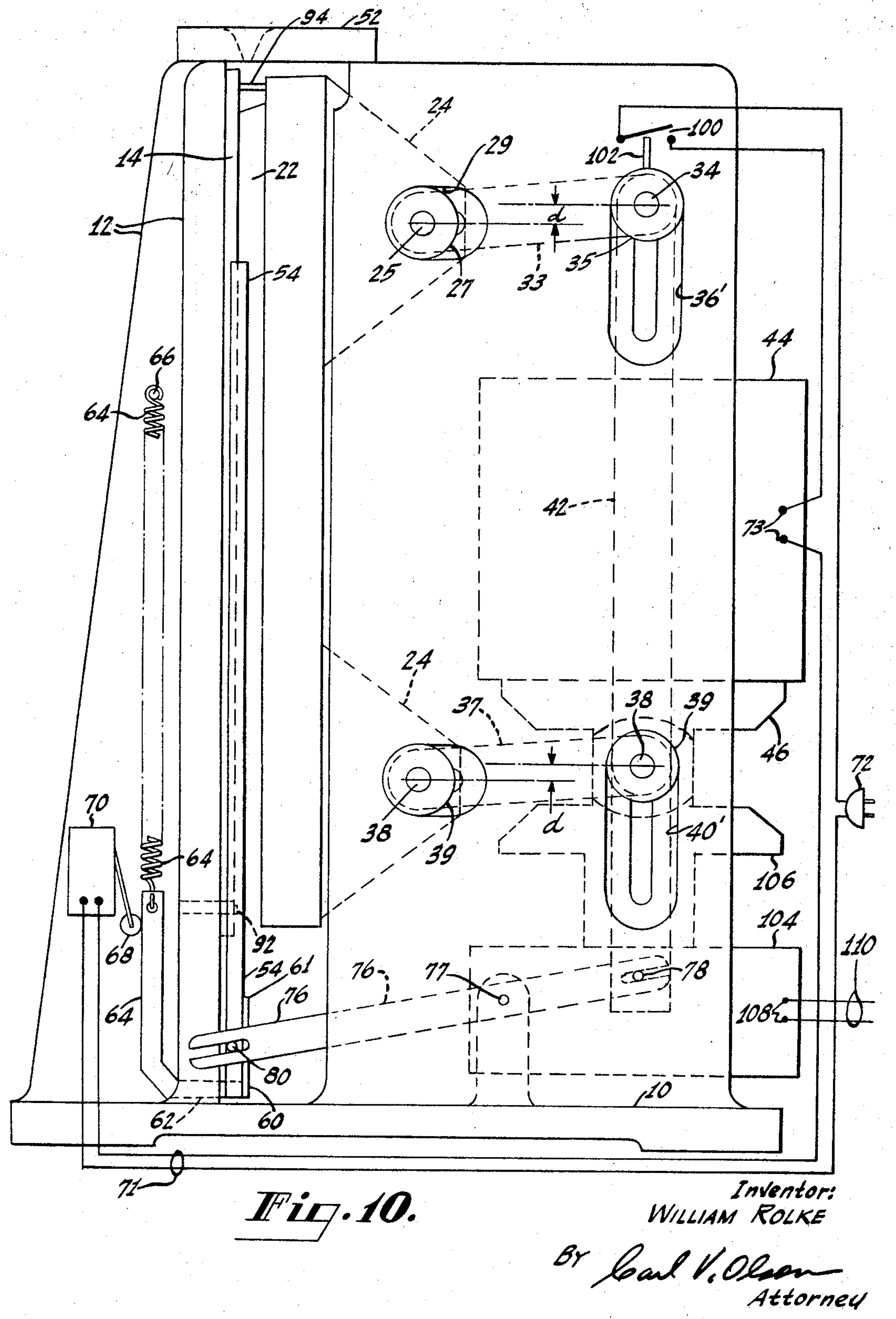
FIG. 10 is a side elevation of a card reader having an alternative construction.

FIG. 10 is a side elevation of a card reader which is different in some respects from the card reader shown in FIGS. 1 through 9. The elements in FIG. 10 which are the same as corresponding elements in FIGS. 1 through 9 are given the same reference numerals, and the elements in FIG. 10 which are different are given the same reference numerals with prime designations added.

In FIG. 10, the vertical tracks 36' and 40' extend upwardly enough so that when wheels 35 and 39 are in the upper positions shown, the axes of the wheels 35 and 39 are a distance *d* above dead-center positions determined by the axes of wheels 27 and 39, respectively. When the wheel 35 is in its uppermost position as shown, it acts through any suitable member 102 to open a normally-closed switch 100. The switch 100 is in circuit with the electric power supplied from plug 72 to electric terminals 73 of solenoid 44.

The embodiment of the invention shown in FIG. 10 includes a second or pull-down solenoid 104 having an armature 106 connected through shaft 38 to the vertical drive links 42. The solenoid 104 is electrically energized at terminals 108 over lines 110 from a computer or other utilization means (not shown).

The operation of the embodiment of the invention shown in FIG. 10 is the same as has been described for the embodiment shown in FIGS. 1 through 9 up to the point where the solenoid 44 is energized causing the vertical drive links 42 to be driven upwardly. The upward movement of vertical drive links 42 causes a downward movement of the frame 54 which draws the punched card into position to be sensed, and causes the moveable plate 20 with sensing strips 22 to be driven horizontally against the punched card. Because the tracks 36' and 40' are elongated upwardly, the upward movement of vertical drive links 42 continues a distance *d* past the dead-center point of maximum horizontal movement of the moveable plate 20. When the parts are in the positions shown in FIG. 10, the back pressure from the compressible resilient rubber sensing strips 22 acting through moveable plate 20 and parallel links 33 and 37 pushes the vertical links 42 upward against the mechanical bias provided by gravity to the upper limit position. Once the position shown is reached, the solenoid 44 is no longer needed to hold the parts in place, and the solenoid is automatically deenergized when the wheel 35 reaches and opens the switch 100.

After the sensing of the holes in the punched card is accomplished by electrical circuitry not shown, and after the information is accepted by a utilization means not shown, the utilization means supplies an energizing current over line 110 to the electric terminals 108 of the second or pull-down solenoid 104. The armature 106 of the second solenoid pulls the vertical drive links 42 downwardly at least an amount *d*. Then the vertical drive links 42 and vertically moveable parts connected thereto, can fall freely by the force of gravity to the position where the wheels 35 and 39 are in the bottom ends of tracks 36′ and 40′. This results in a retraction of the moveable plate 20 from the punched card, and an upward expulsion of the punched card, as has been described in connection with the embodiment of FIGS. 1 through 9.

What is claimed is:

1. A card reader, comprising
 a stationary plate and a moveable plate, said plates having facing card-engaging surfaces provided with sensing means,
 a card-receiving-and-transporting frame mounted between said stationary and moveable plates for reciprocation between a card receiving position and a card sensing position,
 an electrical switch mounted to be acted on and closed by a card supplied to said frame,
 an electromotive unit electrically connected to be actuated in response to the closing of said switch, and
 mechanical linkages connected to said electromotive unit to draw said frame and card to said card sensing position, and to drive said moveable plate toward said stationary plate for sensing the card located at the card sensing position therebetween.

2. A card reader, comprising
 a stationary plate and a moveable plate, said plates having facing card-engaging surfaces provided with sensing means,
 a card-receiving-and-transporting frame mounted between said stationary and moveable plates for reciprocation between a card receiving position and a card sensing position,
 an electrical switch mounted to be acted on and closed by a card supplied to said frame,
 a solenoid electrically connected to be actuated in response to the closing of said switch,
 mechanical linkages connected to said solenoid to draw said frame and card to said card sensing position, and to drive said moveable plate toward the stationary plate for sensing holes in the card therebetween, and
 means to deenergize said solenoid to cause the retraction of said moveable plate, and the return of said frame to eject the card.

3. A card reader, comprising
 a stationary plate having a card-engaging surface provided with column sensing means,
 a moveable plate normally spaced from said stationary plate and having a card-engaging surface provided with row sensing means,
 a card-receiving-and-transporting frame reciprocably mounted between said stationary and moveable plates,
 an electrical switch mounted to be acted on and closed by a card supplied to said frame.
 a solenoid electrically connected to be actuated in response to the closing of said switch,
 a pivoted link connected to said solenoid to draw said frame and card downwardly, and a right angle drive link connected to said solenoid to drive said moveable plate toward the stationary plate for sensing holes in the card therebetween, and
 means to deenergize said solenoid to cause the retraction of said moveable plate, and the upward return of said frame whereby to eject the card.

4. A punched card reader, comprising
 a stationary plate having a card-engaging surface provided with electrically-conductive strips extending in a first direction,
 a moveable plate normally spaced from said stationary plate and having a card-engaging surface provided with resilient, electrically-conductive strips extending in a second direction,
 a U-shaped card-receiving-and-transporting frame located between said stationary and moveable plates and slideably mounted on said stationary plate,
 an electrical switch mounted on said frame to be acted on and closed by a card supplied to said frame,
 a solenoid electrically connected to be actuated in response to the closing of said switch,
 a pivoted link connected to said solenoid to draw said frame and card downwardly, and a right angle drive link connected to said solenoid to drive said moveable plate toward the stationary plate for sensing holes in the card therebetween, and
 means to deenergize said solenoid to cause the retraction of said moveable plate, and the upward return of said frame to eject the card.

5. A manually-fed punched card reader, comprising
 a stationary plate having a stop for arresting a moving card at a sensing position,
 a moveable plate normally spaced from said stationary plate,
 a card-receiving-and-transporting frame reciprocably mounted between said stationary and moveable plates and having card-gripping means thereon,
 an electrical switch mounted to be acted on and closed by a card supplied to said frame,
 a hopper for guiding a manually-fed card into said frame to an almost completely enveloped position at which the card closes said electrical switch,
 a solenoid electrically connected to be actuated in response to the closing of said switch,
 mechanical linkages connected to said solenoid to draw said frame with a given overtravel past said card sensing position at which the card is arrested by said stop, and to drive said moveable plate toward the stationary plate for sensing holes in the card therebetween, and
 means to deenergize said solenoid to cause the retraction of said moveable plate, and the return of said frame to eject the card to a position protruding from said hopper by substantially the amount of said overtravel.

6. A manually-fed card reader, comprising
 a vertically-mounted stationary plate having a stop for arresting a moving card at a sensing position,
 a vertically-mounted moveable plate normally spaced from said stationary plate,
 a U-shaped card-receiving-and-transporting frame reciprocably mounted between said stationary and moveable plates and having card-gripping means thereon,
 an electrical switch mounted to be acted on and closed by a card supplied to said frame,
 a hopper for guiding a manually-fed card into said frame to an almost completely enveloped position at which the card closes said electrical switch,
 a solenoid having an armature which is pulled upwardly in response to the closing of said switch,
 pivoted linkages connected to said solenoid to draw said frame downwardly with a given overtravel past said card sensing position at which the card is arrested by said stop, and right angle drive linkages connected to said solenoid to drive said moveable plate horizontally toward the stationary plate for sensing the card therebetween, and
 means to deenergize said solenoid to permit the return by gravity of said armature, whereby to cause the retraction of said moveable plate, and the upward return of said frame to eject the card to a position protruding from said hopper by substantially the amount of said overtravel.

7. A manually-fed punched card reader, comprising
 a stationary plate having a card-engaging surface provided with parallel, electrically-conductive column sensing strips extending in a first direction, said stationary plate having a stop for arresting a moving card at a sensing position, a moveable plate normally spaced from said stationary plate and having a card-engaging surface provided with parallel, resilient, electrically-conductive row sensing strips extending in a second direction, a U-shaped card-receiving-and-transporting frame having sides slideably mounted on sides of said stationary plate with an offset therefrom to receive the side edges of a card between the stationary plate and the frame, card-gripping spring fingers on the sides of said frame, and a card-operated switch trip means mounted with limited freedom on the bottom end of said frame, an electrical switch mounted on said stationary plate, a hopper for guiding a manually-fed card into said frame to an almost completely enveloped position at which the card acts through said switch trip means to close said electrical switch, a solenoid electrically connected to be actuated in response to the closing of said switch, mechanical linkages connected to said solenoid to draw said frame downwardly with a given overtravel past said card sensing position at which the card is arrested by said stop, and to drive said moveable plate toward the stationary plate for electrically sensing holes in the card therebetween, said switch trip means being constructed to maintain said switch closed when the frame is displaced downwardly, and means to deenergize said solenoid to cause the retraction of said moveable plate, and the upward return of said frame to eject the card to a position protruding from said hopper by substantially the amount of said overtravel.

8. A manually-fed punched card reader, comprising a vertically-mounted stationary plate having a card-engaging surface provided with parallel, electrically-conductive column sensing strips extending in a first direction, said stationary plate having a stop for arresting a moving card at a sensing position, a vertically-mounted moveable plate normally spaced from said stationary plate and having a card-engaging surface provided with parallel, resilient, electrically-conductive row sensing strips extending in a second direction, a U-shaped card-receiving-and-transporting frame having sides slideably mounted on sides of said stationary plate with an offset therefrom to receive the side edges of a card between the stationary plate and the frame, card-gripping spring fingers on the sides of said frame, and a card-operated switch trip means mounted with limited freedom on the bottom end of said frame, an electrical switch mounted on said stationary plate, a hopper for guiding a manually-fed card into said frame to an almost completely enveloped position at which the card acts through said switch trip means to close said electrical switch, a solenoid having an armature which is pulled upwardly in response to the closing of said switch, pivoted linkages connected to said solenoid to draw said frame downwardly with a given overtravel past said card sensing position at which the card is arrested by said stop, and right angle drive linkages connected to said solenoid to drive said moveable plate horizontally toward the stationary plate for electrically sensing holes in the card therebetween, said switch trip means being constructed to maintain said switch closed when the frame is displaced downwardly, and means to deenergize said solenoid to permit the return by gravity of said armature, whereby to cause the retraction of said moveable plate, and the upward return of said frame to eject the card to a position protruding from said hopper by substantially the amount of said overtravel.

9. A manually-fed punched card reader as defined in claim 8, and in addition, a contact pin projecting from said moveable plate and a contact on said stationary plate, said pin and contact being located in the cut-off corner region of a punched card when the card is accurately registered in the card sensing position.

References Cited

UNITED STATES PATENTS

| | | | |
|---|---|---|---|
| 3,066,863 | 12/1962 | Wilson | 235—61.11 |
| 3,139,519 | 6/1964 | Reinschmidt. | |
| 3,308,252 | 3/1967 | Rosen | 200—46 |
| 3,352,981 | 11/1967 | Ekers. | |

OTHER REFERENCES

Robitscheck, "Brush Punched Card Sensing Device," RCA Technical Notes No. 504, March 1962.

MAYNARD R. WILBUR, *Primary Examiner.*

THOMAS J. SLOYAN, *Assistant Examiner.*

U.S. Cl. X.R.

260—518, 326.14